(12) United States Patent
Lin

(10) Patent No.: US 7,116,066 B2
(45) Date of Patent: Oct. 3, 2006

(54) POWER SUPPLY CIRCUIT OF A HIGH SPEED ELECTRIC MOTOR

(75) Inventor: Huai Yu Lin, Kirkland (CA)

(73) Assignee: Turbocor, Inc., St-Laurent (CA)

( * ) Notice: Subject to any disclaimer, the term of this patent is extended or adjusted under 35 U.S.C. 154(b) by 0 days.

(21) Appl. No.: 10/536,938

(22) PCT Filed: Sep. 23, 2003

(86) PCT No.: PCT/CA03/01454

§ 371 (c)(1), (2), (4) Date: Jan. 26, 2006

(87) PCT Pub. No.: WO2004/049551

PCT Pub. Date: Jun. 10, 2004

(65) Prior Publication Data

US 2006/0125436 A1 Jun. 15, 2006

(30) Foreign Application Priority Data

Nov. 25, 2002 (AU) .............................. 2002952885

(51) Int. Cl.
*H02P 1/54* (2006.01)
(52) U.S. Cl. ..................... 318/108; 318/109; 318/107
(58) Field of Classification Search ............... 318/108, 318/109, 107, 376
See application file for complete search history.

(56) References Cited

U.S. PATENT DOCUMENTS

| 5,574,345 | A * | 11/1996 | Yoneta et al. ............ 318/376 |
| 5,782,610 | A * | 7/1998 | Ikeda ....................... 417/53 |
| 6,239,566 | B1 * | 5/2001 | Tareilus et al. .......... 318/379 |
| 6,462,976 | B1 * | 10/2002 | Olejniczak et al. ....... 363/147 |
| 6,617,734 | B1 * | 9/2003 | Taniguchi et al. ........ 310/90.5 |
| 6,819,012 | B1 * | 11/2004 | Gabrys ...................... 307/68 |

(Continued)

FOREIGN PATENT DOCUMENTS

AU    B-69657/94    6/1994

(Continued)

OTHER PUBLICATIONS

Becerra RC et al. "Four-quadrant brushless ecm drive with integrated current regulation" IEEE Inc. New York. vol. 28, No. 4.p. 833-841. 1992.

(Continued)

*Primary Examiner*—Rita Leykin
(74) *Attorney, Agent, or Firm*—Schnader Harrison Segal & Lewis, LLP; Joan T. Kluger

(57) ABSTRACT

A power control system (12) for an electric motor having at least one magnetic bearing includes a DC/DC converter (18) supplied from a DC link bus (179) connected to a main power supply (14), the bus (17) supplying power for the electric motor and for a bearing actuator the converter (18) provides low voltage DC power supplies for a motor controller (23), a bearing controller (24) and a supervisory controller (26), the later monitoring the main power supply and communicating with the motor controller (23) and bearing controller (24) so as to cause the motor to operate as a generator in the event of a failure of the main power supply (14) to thereby supply power to the DC link bus (17) to maintain operation of the magnetic bearing. Circuit switching components are connected to the motor winding and selectively switched in a manner causing current generated in the motor winding to flow in one direction into the DC link bus (17) only while the winding voltage is greater than that of the DC link bus (17).

10 Claims, 3 Drawing Sheets

U.S. PATENT DOCUMENTS

2002/0047402 A1    4/2002   Miyagawa et al.

FOREIGN PATENT DOCUMENTS

| EP | 0 825 702 | 2/1998 |
| EP | 0 920 119 | 6/1999 |
| WO | WO 98/33260 | 7/1998 |

OTHER PUBLICATIONS

Patent Abstract of Japan. vol. 2000, No. 12, 2001. & JP 2000 257634 A, Koyo Seiko Co. Ltd; Nippon Inventer KK, 2000.

* cited by examiner

POWER SUPPLY CIRCUIT OF A HIGH SPEED ELECTRIC MOTOR

FIELD OF THE INVENTION

This invention relates to a power supply for a high speed electric motor and relates particularly to a power supply for a motor using magnetic bearings.

International Patent Application No. WO 98/33260 describes a high speed electric motor which is particularly suitable for use as a refrigeration compressor motor. Such a motor may be used in, for example, a compressor of the type described in Australian Patent No 686174 and utilizing magnetic bearings for the suspension of rotating parts.

BACKGROUND OF THE INVENTION

A known difficulty with the use of magnetic bearings is to supply power to the bearings during a system power failure, during which the power supply to the motor fails. While it is known to use auxiliary or back-up power supplies to the system, such as by way of batteries or the like, such auxiliary power supplies are relatively expensive and require additional switching controls to enable the auxiliary supply to take over when the main power supply fails. Further, the batteries have a limited life and generally must be replaced every two (2) years. This adds substantial further costs to the system.

It is therefore desirable to provide an improved power supply system for a high speed electric motor running in magnetic bearings which can maintain power to the bearings in the event of a main power supply failure.

It is also desirable to provide a power supply system for continuously supplying power to the magnetic bearings of a high speed electric motor following a failure of the main power supply until such time as the rotating parts are at rest.

It is also desirable to provide an improved controller for a high speed electric motor which enables a spinning rotor to spin down under controlled conditions.

It is also desirable to provide a power supply controller for a high speed electric motor with magnetic bearings which is relatively inexpensive, which is efficient in its operation and which provides a substantially fail-safe power supply for the magnetic bearings.

SUMMARY OF THE INVENTION

In accordance with one aspect of the invention there is provided a power control system for an electric motor having at least one magnetic bearing, said system comprising a DC/DC converter supplied from a DC link buss connected to a main power supply, said buss supplying power for the electric motor and for a bearing actuator, said converter providing low voltage DC power supplies for a motor controller, a bearing controller and a supervisory controller, the supervisory controller monitoring the main power supply and communicating with the motor controller and bearing controller so as to cause the motor to operate as a generator in the event of a failure of the main power supply to thereby supply power to the DC link buss to maintain operation of the magnetic bearing characterised in that, circuit switching components are connected to the motor winding and selectively switched in a manner causing current generated in the motor winding to flow in one direction into said DC link buss only while the winding voltage is greater than that of the DC link buss.

The invention is preferably adapted for use with a high speed electric motor, the rotor of which is supported solely by magnetic bearings. The invention may also be utilised for an electric motor having a combination of magnetic and gas bearings.

Preferably, the DC link buss incorporates at least one capacitor, which, in normal use, is maintained in a charged condition by the main power supply. The capacitor is able to provide sufficient power in conjunction with that supplied by the motor running as a generator to run down the motor from full speed and maintain operation of the magnetic bearings during the run down period. Running the motor as a generator during the run down period extracts the kinetic energy stored in the motor and other rotating parts and constitutes an electric brake to quickly and safely stop the rotor rotation. During the run down period, power continues to be supplied from the motor, running as a generator, to the DC link buss which provides an uninterruptable power supply to the DC/DC converter and the several controllers as well as the magnetic bearing actuator for the full run down period.

In accordance with another aspect of the invention there is provided a method of running down a high speed DC electric motor run on magnetic bearings in the event of a failure of the main power supply, said method including the steps of supplying the motor and the magnetic bearings from a high voltage DC buss connected to the main power supply, proving a DC/DC converter to supply low voltage DC power to a magnetic bearing controller and to a motor controller, using switching devices to control the motor operation, sensing a failure of said main power supply and providing a signal to the motor controller, characterized in that, said switching devices are selectively controlled on sensing said failure, to initially feed existing motor current to said buss, detecting when said buss voltage drops below a predetermined value and shorting said motor winding, and as soon as current flow in said winding commences, as a result of the short, removing said short whereby the winding voltage rises to above the buss voltage, feeding the resulting generated current back to said buss, and repeating said selective control as necessary until said motor is run down.

According to one embodiment of the invention the power control system incorporates a plurality of switches operable to switch power between the two polarities of the DC buss and each end of the motor winding to switch the current flow through the winding. Each switch has a diode in parallel. When a mains power failure is sensed, such as by measuring a voltage drop across the buss, the switches are all switched to the "off" position and current existing in the motor coil is fed to the buss. As soon as the buss voltage drops again, the motor winding is shorted by closing the appropriate switches and then opened to let the current, generated by shorting the winding, be pumped back into the buss through the diodes.

This control method uses the existing motor control IGBT switches to realise the generator function of the motor when the buss voltage falls. With this control system, there is no need to track the rotor position and control switching as a function of rotor position. The diodes enable the motor to act as a generator with all switches in the open position and the current being pumped into the buss to assist the installed capacitor for maintaining the buss voltage until the motor is run down.

One embodiment of the invention will now be described with reference to the accompanying drawing wherein.

DESCRIPTION OF ONE EMBODIMENT

Figure 1:
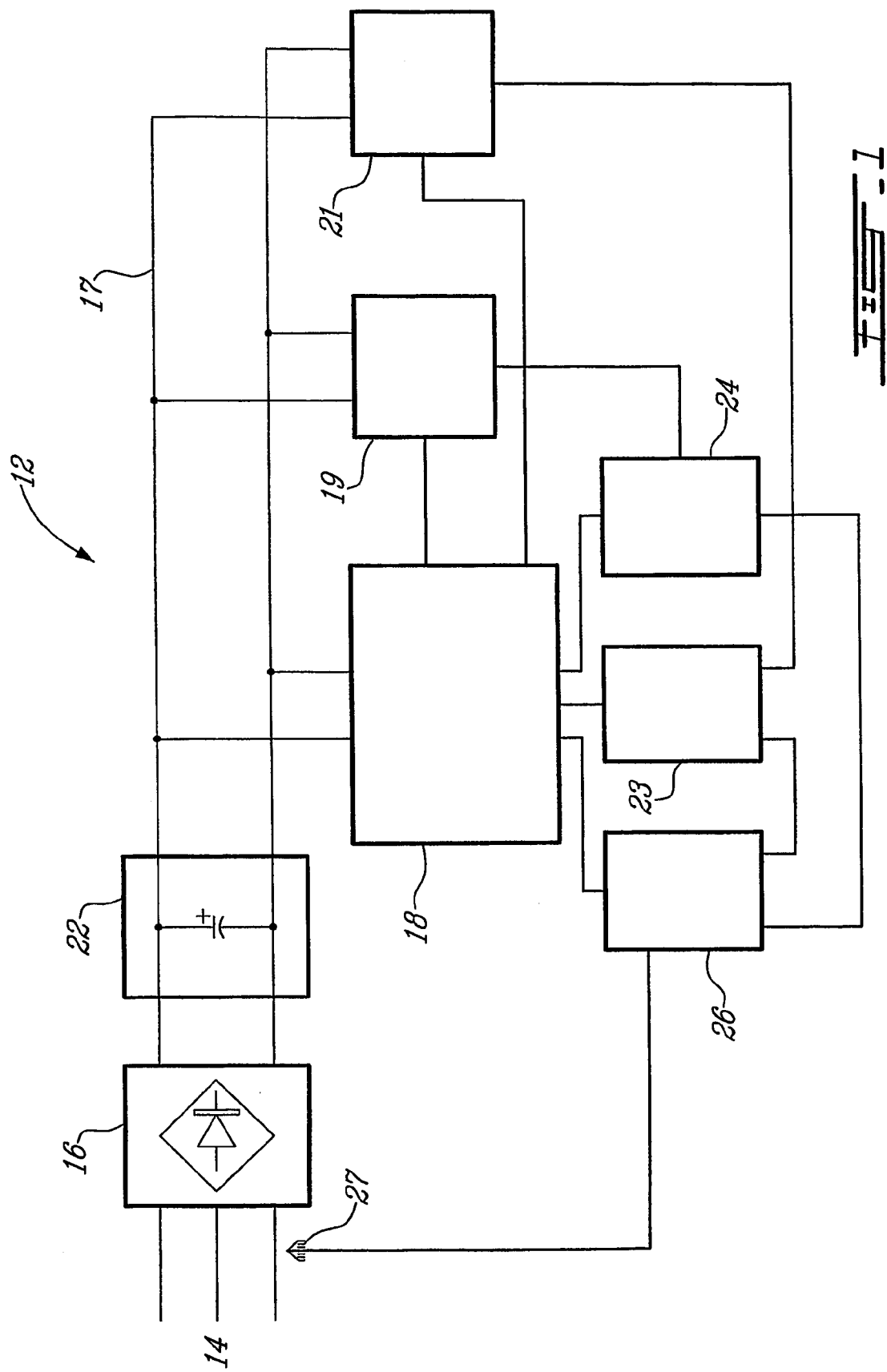
FIG. 1 is a block diagram of a power control system in accordance with the present invention.

Referring to the drawings and firstly FIG. 1, the power control system 12 is connected to a three phase AC power supply 14 through a bridge rectifier 16. A DC link buss 17 supplies DC power to a DC/DC converter 18, magnetic bearing actuator 19 and electric motor power supply 21. A large capacitor 22 or capacitor bank is connected across the link buss 17 to provide a buffer of stored power for motor run down. In this embodiment, the DC link buss voltage is 1000V and the capacitor, or several capacitors, will have a capacity sufficient for a motor run down time of about 0.1 sec to about 1.5 sec, in the absence of any other power source.

The DC/DC converter 18 provides low voltage DC power for a motor controller 23, a bearing controller 24 and a supervisory controller, which, in this embodiment, takes the form of a computer 26. The converter 18 also supplies low voltage power for various sensors associated with the magnetic bearings and for Insulated Gage Bipolar Transistors (IGBT) (not shown) which are used for control purposes in the magnetic bearing actuator 19 and the electric motor power supply 21. The magnetic bearing actuator 19 and associated IGBTs and the electric motor power supply 21 and its associated IGBTs are known in the art and will not be described in detail. Gate drive signals for the various IGBTs are generated by the bearing controller 24 and motor controller 23, respectively, to provide the desired operational parameters for the electric motor bearings.

An AC power monitor 27 provides a signal to the supervisory computer 26 in the event of a failure of the main AC power supply 14. Alternatively, the supervisory computer 26 may monitor the buss voltage, through DC/DC converter 18, to detect a power failure which results in a voltage drop across the capacitor 22. On detection of a power failure, the motor controller 23 controls the IGBTs to feed existing motor current to the DC link buss and to then open whereby motor winding current reverses relative to the motor magnetic field thereby turning the electric motor into a generator.

Figure 2:
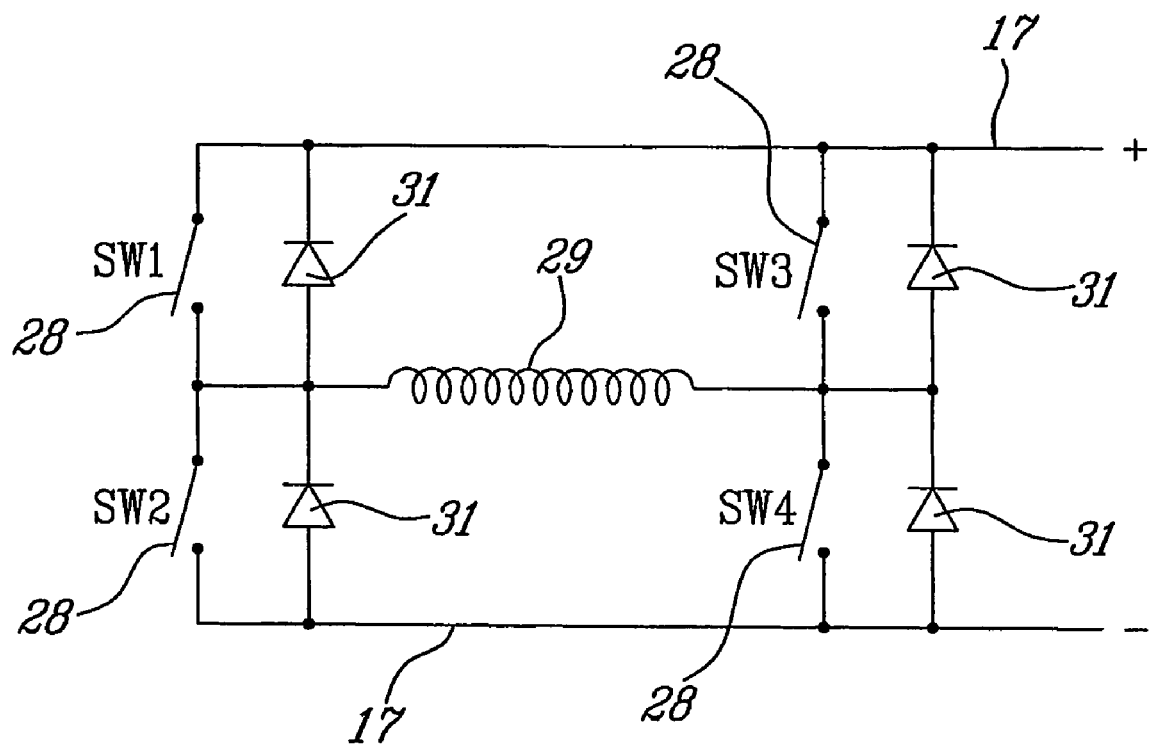
FIG. 2 is a schematic circuit diagram illustrating the control switches for a single phase motor and FIG. 3 is a flow chart of the control algorithm of the system shown in FIGS. 1 and 2.

Referring to FIG. 2, the IGBT switches 28, which are controlled by the motor 23, connect motor winding 29 to the DC buss 17 in accordance with the rotor position. While four switches 28 are shown in FIG. 2, in a three phase motor structure, six switches 28 will be provided.

Each switch 28 has a parallel diode 31 the polarity of which opposes the motor current flow. When a power failure is detected either by power monitor 27 or by detecting a voltage drop across the capacitor 22, all switches are turned off, or opened, and existing current in the motor winding 29 flows through the relevant diodes 31 to the buss 17. This provides an immediate boost to the buss voltage, and as soon as the buss voltage again drops, two switches SW1 and SW3 or SW2 and SW4 are closed to short circuit the motor winding 29 and immediately initiate flow of current therethrough. As soon as the current flow commences as a result of the short, the switches are again turned off whereby the winding voltage rises to above the buss voltage and generated current is pumped back to the capacitor 22.

With this arrangement, it is not necessary for the control system to know the voltage inside the motor winding 29 or the relative position of the rotor. The generated current in the motor winding 29 can only go in one direction through the diodes 31 into the DC buss and only while the winding voltage is greater than that of the DC buss 17.

It will be seen that, when a power failure is detected, the switches are actuated, under control of the motor controller 23, to ensure that the motor runs as a generator for the time of the power failure or until motor rundown.

The power developed by the motor/generator 21 is fed into the DC link buss 17 to maintain the power supply for the magnetic bearings 18. By drawing power from the motor 21, the rotor is electrically braked thereby taking potentially hazardous kinetic energy away from the rotor shaft. The power generated during the run down together with the power stored in the capacitor 22 maintains the power supply to the magnetic bearings 18 and the controllers 23 and 24 for sufficient time to enable the motor 21 and associated rotating parts to run down to a stop.

Figure 3:
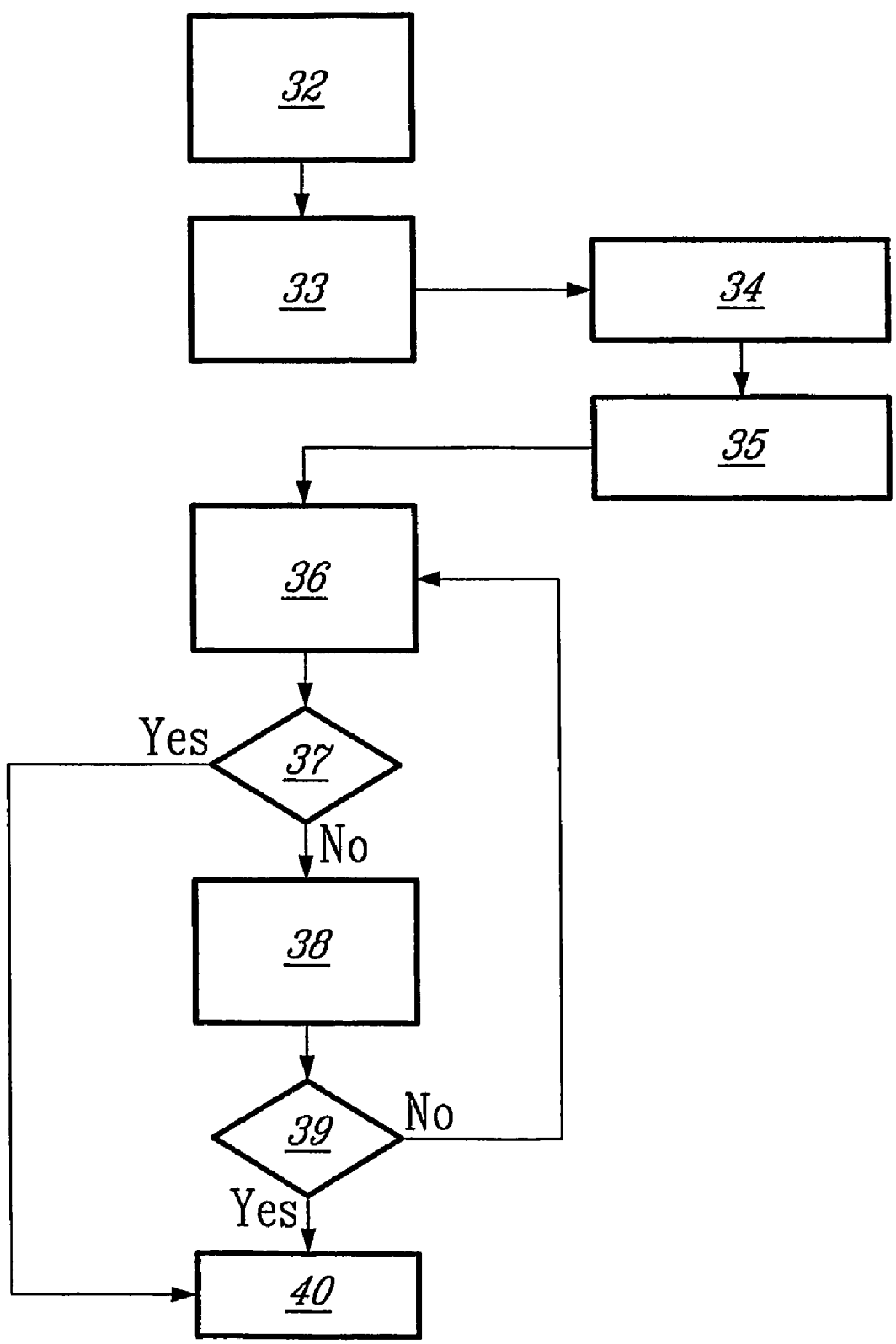

FIG. 3 shows the control algorithm of a program of the supervisory controlled 26 of the system of FIGS. 1 and 2. The program commences at box 32 ("power failure detected") where the power failure is detected either by power monitor 27 or by detecting a voltage drop across the capacitor 22. At this point the switches 28 are open and the motor acts as a generator (generator mode box 33) and existing current in motor winding 29 flows to the buss 17 through relevant diodes 31. Program box 34 involves controlling the switches 28 (IBGT's) to feed current back to the buss 17 and boost buss voltage. The swithes 28 are opened when this current reversal occurs (box 35). As soon as the buss voltage again drops switches SW1 and SW3 or SW2 and SW4 are closed (box 36) to short circuit the motor winding 29. If the winding current is "higher than a pre-set value" (box 37) the program moves to the exit box 40. If the winding current is not higher than the pre-set value the program moves to box 38 which causes switches SW1 and SW3 or SW2 and SW4 (whichever pair was previously turned on) to open. The next decision point is box 39 where the voltage rise across the buss is monitored and if the voltage rises above a pre-set value the program is then exited via box 40. If the voltage rise is less than the pre-set value the program reverts to box 36 and repeats the procedure.

In one particular form of the invention, when the electric motor is used to drive a refrigeration compressor, the supervisory computer, on sensing a power failure, will also operate to unload the compressor.

Subject to the motor speed, the inertia of the rotating parts associated with the motor and any external load on the motor, a run down time of between 2 to 3 seconds is achievable. By operating the motor 21 as a generator and supplying power to the DC link buss 17, the charge in the capacitor 22 is able to be maintained for all of the run down time. By maintaining a power supply to the magnetic bearings during run down, damage to the bearings is avoided and the motor is able to be safely brought to rest.

The invention claimed is:

1. A power control system for an electric motor having at least one magnetic bearing, said system comprising:
   a main power supply;
   a DC link bus connected to said main power supply, said bus supplying power for the electric motor and for a bearing actuator;
   a motor controller;
   a bearing controller;
   a supervisory controller;
   a DC/DC converter supplied from said DC link bus, said DC/DC converter providing low voltage DC power supply for said motor controller, said beanng controller and said supervisory controller,
   said supervisory controller receiving signals from an AC power monitor and a capacitor connected across said DC link bus, said supervisory controller then signaling said motor controller, said motor controller controlling IGBT switches connecting motor winding to the DC link bus in accordance with a position of a rotor of the motor; each switch having a parallel diode of a polarity opposing a motor current flow during normal operation of said main power supply;

wherein, in one of: signals of failure from the AC power monitor and of: a drop in a voltage across said capacitor, all switches are turned off and an existing current in the motor winding flows through corresponding diodes to the DC link bus, thereby providing an immediate boost to a voltage of the DC link bus; when the DC link bus voltage drops, two switches are closed to short circuit the motor winding and immediately initiate flow of a current therethrough; and as soon as the current flow reaches a predetermined magnitude, the switches are turned off, whereby a winding voltage rises to above the bus voltage and a generated current is pumped back to the capacitor.

2. The power control system as defined in claim 1, said switches being selectively switched to cause the current generated in the motor winding to flow in one direction into said DC link bus only while the winding voltage is greater than the voltage of the DC link bus.

3. The power control system as defined in any claim 1, said switches comprising a first and a second switches connected between a first end of the motor winding and positive and negative sides of said DC link bus respectively; a third and a fourth switches connected between a second end of the motor winding and the positive and negative sides of said DC link bus respectively, a parallel diode being connected across each switch to oppose a normal motor current flow.

4. The power control system as defined in claim 3, wherein either said first and third or said second and fourth switches are turned on to generate the current in the motor winding, and immediately when a desired current is generated said switches are turned off, whereby the winding voltage rises above the DC link bus voltage and the current flows into the DC link bus.

5. The power control system as defined in claim 4, said switches being opened when the power failure is detected so that the existing motor current flows through corresponding diodes and into the DC link bus to boost the DC link bus voltage, and when said DC link bus voltage drops, either said first and third, or said second and fourth switches are closed to short circuit the motor winding and immediately initiate current flow therethrough, whereupon said switches are opened causing the winding voltage to rise above the DC link bus voltage, the generated current being fed back to the DC link bus.

6. The power control system as defined in claim 5, the voltage across the do link bus being determined by a capacitor connected between the positive and negative sides of the DC link bus, said connector storing power fed back from the winding for motor run down.

7. A method of running down a high speed DC electric motor run on magnetic bearings in an event of a failure of a main power supply thereof, including the steps of:

supplying the motor and the magnetic bearings from a high voltage DC bus connected to the main power supply;

providing a DC/DC converter to supply low voltage DC power to a magnetic bearing controller and to a motor controller, using switching devices to control a motor operation;

sensing a failure of the main power supply and providing a signal to the motor controller; and selectively controlling the switching devices;

said step of selectively controlling the switching devices comprising initially feeding an existing motor current to the DC bus, detecting when a voltage of the DC bus drops below a predetermined value, shorting windings of the motor, and as soon as a current flow in the motor winding reaches a predetermined magnitude, canceling said shorting of the windings of the motor, whereby the windings voltage rises to above the voltage of the DC bus; feeding a resulting generated current back to the DC bus;

said step of selectively controlling the switching devices being repeating until the motor is run down.

8. The method according to claim 7, further comprising the steps of connecting a capacitor across the DC bus and of providing an AC power monitor for the main power supply, said step of sensing a failure of the main power supply comprising one of: sensing a voltage drop across the capacitor and of the AC power monitor omitting a power failure signal.

9. The method according to claim 7, said step of detecting when the bus voltage drops below a predetermined value comprising measuring an indicator voltage by means of a voltage sensor.

10. The method according to claim 8, the switching devices comprising IGBT switches connected between each end of the motor winding and positive and negative side of the DC bus respectively, a diode being connected in parallel with each switch, the diodes enabling the motor to act as a generator and feed current into the DC bus to assist the capacitor in maintaining the bus voltage until the motor is run down.

* * * * *